(12) United States Patent
Carpenter et al.

(10) Patent No.: US 11,336,791 B2
(45) Date of Patent: May 17, 2022

(54) PRINTER USB HUB FOR PERIPHERAL CONNECTIONS

(71) Applicant: Xerox Corporation, Norwalk, CT (US)

(72) Inventors: Brian M. Carpenter, Rochester, NY (US); James M. Maryniak, Webster, NY (US); Rui M. Amorim, Fairport, NY (US); John M. Rondeau, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/007,010

(22) Filed: Aug. 31, 2020

(65) Prior Publication Data
US 2022/0070324 A1 Mar. 3, 2022

(51) Int. Cl.
| H04N 1/00 | (2006.01) |
| G06F 1/26 | (2006.01) |
| G06F 13/38 | (2006.01) |

(52) U.S. Cl.
CPC .......... *H04N 1/00907* (2013.01); *G06F 1/26* (2013.01); *G06F 13/382* (2013.01); *H04N 1/00493* (2013.01); *G06F 2213/0042* (2013.01); *G06F 2213/4004* (2013.01)

(58) Field of Classification Search
CPC ........ G06F 3/12; G06F 1/1632; G06Q 20/206
See application file for complete search history.

(56) References Cited

U.S. PATENT DOCUMENTS

| 6,205,501 B1 | 3/2001 | Brief et al. |
| 7,911,626 B2 | 3/2011 | Ferlitsch |
| 8,051,308 B2 | 11/2011 | Hsieh |
| 8,447,890 B1 | 5/2013 | LeTourneur et al. |
| 9,558,482 B2 | 1/2017 | Hicks et al. |
| 10,089,615 B2 | 10/2018 | Edwards et al. |
| 10,635,393 B2 | 4/2020 | Sadeghi et al. |
| 2004/0184078 A1* | 9/2004 | Endo ................. H04N 1/00132 358/1.15 |
| 2004/0267501 A1* | 12/2004 | Freed ..................... H02J 50/12 702/184 |
| 2005/0278463 A1* | 12/2005 | Ando .................. G06F 13/4217 710/8 |
| 2009/0024855 A1 | 1/2009 | Hsieh |
| 2010/0265179 A1 | 10/2010 | Ram |
| 2015/0220255 A1 | 8/2015 | Maeda |
| 2016/0283930 A1* | 9/2016 | Haga ................... G06F 13/4081 |
| 2016/0308969 A1* | 10/2016 | Aihara .................... G06F 16/29 |
| 2016/0370835 A1 | 12/2016 | Erickson et al. |
| 2017/0346962 A1* | 11/2017 | Yamada ............. H04N 1/32122 |

* cited by examiner

*Primary Examiner* — Getente A Yimer
(74) *Attorney, Agent, or Firm* — Gibb & Riley, LLC (57) ABSTRACT

Printing devices herein comprise an internal power supply within the body of the printing devices. Also, a processor and printing components are within the body and connected to the internal power supply. A user interface is external to the body and is connected to the processor and the internal power supply. The user interface has a universal serial bus (USB) connection. A USB hub structure is within the body and is connected to the processor, the internal power supply, and the user interface. The USB hub structure includes an integrated circuit (IC), a power connector connected to the internal power supply, and a plurality of USB connectors connected to the IC. The USB connectors can extend through the body and one of the USB connectors connects the USB connection of the user interface to the processor and the internal power supply.

17 Claims, 5 Drawing Sheets

PRINTER USB HUB FOR PERIPHERAL CONNECTIONS

BACKGROUND

Systems and methods herein generally relate to printing devices and more particularly to connections of peripherals of such printing devices.

When designing printing devices (e.g., laser printers, ink jet printers, offset printers, multi-function devices (MFDs) that can print, scan, fax, etc.) it can often be efficient to source components from other uses. For example, touchscreen user interfaces for printing devices offer increased user friendliness. Further, because touchscreen devices are commonly available and used in laptop computers, tablet devices, cell phones, etc., they can be purchased as off-the-shelf items (commercial-off-the-shelf (COTS)) and simply attached to the printing device. This eliminates the need to design and develop a dedicated touchscreen device, bar code reader, credit card reader, etc., for each and every different printing device.

While using off-the-shelf devices has such advantages, they can also suffer from other characteristics. In one example, the connection between the processor and other printer peripherals can be challenging and the way in which off-the-shelf devices are powered can be cumbersome and unattractive. Also, off-the-shelf devices often generate unnecessary heat do to their inexpensive and inefficient internal power supplies that are mounted in enclosures that trap heat. Additionally, while manufacturers can save design and manufacturing resources by purchasing off-the-shelf devices from suppliers, such devices can be more expensive relative to in-house manufactured USB hub devices.

In one example, it may be necessary to design a unique wiring element that connects the processor and other components of the printer to the input/output of an off-the-shelf device. Further, off-the-shelf devices are generally designed and manufactured to be relatively inexpensive; however, a common result of such cost reductions is that off-the-shelf devices can have a short useful life and this causes mechanical redesign, software changes and additional regression testing which can unnecessarily consume design and testing resources.

Also, off-the-shelf devices are often designed with a standardized AC/DC converter ("brick") that converts the alternating current (AC) of electrical outlets to the specific voltage/amperage direct current (DC) used by that off-the-shelf device. Off-the-shelf devices advantageously utilize such dedicated AC/DC converters to allow the off-the-shelf devices to be used in a wider range of applications and to relieve the designer of the printer of any concerns regarding supplying the correct power to the off-the-shelf devices. However, again, such off-the-shelf devices can require cumbersome connections and require the customer to provide an additional AC outlet to run the printer.

SUMMARY

Exemplary printing devices herein include, among other components, an internal power supply within the body of the printing device. Additionally, a processor is located within the body and is connected to the internal power supply. Further, printing components are within the body and are connected to the internal power supply and the processor. A user interface (e.g., a tablet interface device) is positioned external to the body but is connected to the processor and the internal power supply. The user interface has a single universal serial bus (USB) connection for connecting to the processor, peripherals etc.

A USB hub structure is also within the body of the printing device and is connected to the processor, the internal power supply, the user interface, other peripherals, etc. In some examples herein, the USB hub structure can include a circuit board (e.g., printed circuit board assembly (PCBA)) positioned within the body of the printing device. Such a circuit board includes components such as an integrated circuit (IC) mounted on the circuit board within the body, a power connector mounted on the circuit board within the body and connected to the internal power supply, a backplane connector mounted on the circuit board within the body and connected to the IC and the processor, an ethernet connector mounted on the circuit board and connected to the IC, a plurality of USB connectors mounted on the circuit board and connected to the IC, etc.

While most of the components of the circuit board are internal to the body of the printing device, some of the USB connectors and the ethernet connector can optionally extend through the body to allow external devices to be easily connected to the circuit board. For example, at least one of the USB connectors connects the USB connection of the user interface to the processor and to the internal power supply through the circuit board power connector. Also, a bar code reader and/or a credit card reader can be connected to at least one of the internal USB connectors (and possibly the ethernet connector). In additional examples, a light emitting diode (LED) connector can be mounted on the circuit board and connected to the IC, and the LED connector can also allow connection to an LED board that has LED lights and is visible from a location external to the body.

In some embodiments, the internal power supply is an AC/DC converter and the USB hub structure is separate from the internal power supply, which separates the heat generated by the AC/DC converter from reaching the circuit board. Further, the USB hub PCBA may also have a high efficiency DC to DC converter which further reduces the heat generated at or near the circuit board.

Therefore, the USB connection of the user interface to one of the USB connectors supplies both data and power to the user interface and this is the only electrical and communication connection between the user interface and the printing device. This eliminated multiple connections to the user interface and simplifies connecting the user interface to the printing device.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, off-the-shelf devices can ease design requirements; however, such can also mandate the undesirable use of multiple connections for power and communications and some of these connections can be complex in design. Further, the separate power supplies of off-the-self devices can undesirably require more AC outlets and the low efficiency internal power supplies of such devices can generate excess heat and may be unreliable.

Therefore, the systems and methods herein provide a custom designed universal serial bus (USB) hub integral to printing devices that connects to off-the-shelf or dedicated peripheral devices. The printer-integral USB hub provided herein supplies both power and communication connections through each individual USB connector, thereby simplifying and improving the appearance of connections between the peripheral devices and the printing device. Further, the power supply integral to the printing device (e.g., the power supply that supplies power to all other components of the printing device) is designed herein to supply the specific DC voltage/amperage used by each different peripheral anticipated to be connected to the printing device, eliminating the need for the USB hub to perform the AC/DC power conversion, which saves costs, reduces heat generation, and increases reliability. Also, the USB hub allows the peripheral devices to directly connect to other peripherals that can connect to the USB hub, including bar code readers, card readers, customer devices, etc., thereby providing additional USB ports used by the system and reducing the load on the bandwidth of the processor of the printing device to avoid associated processing delay and unnecessary consumption of the printing processor's resources.

Figure 1:
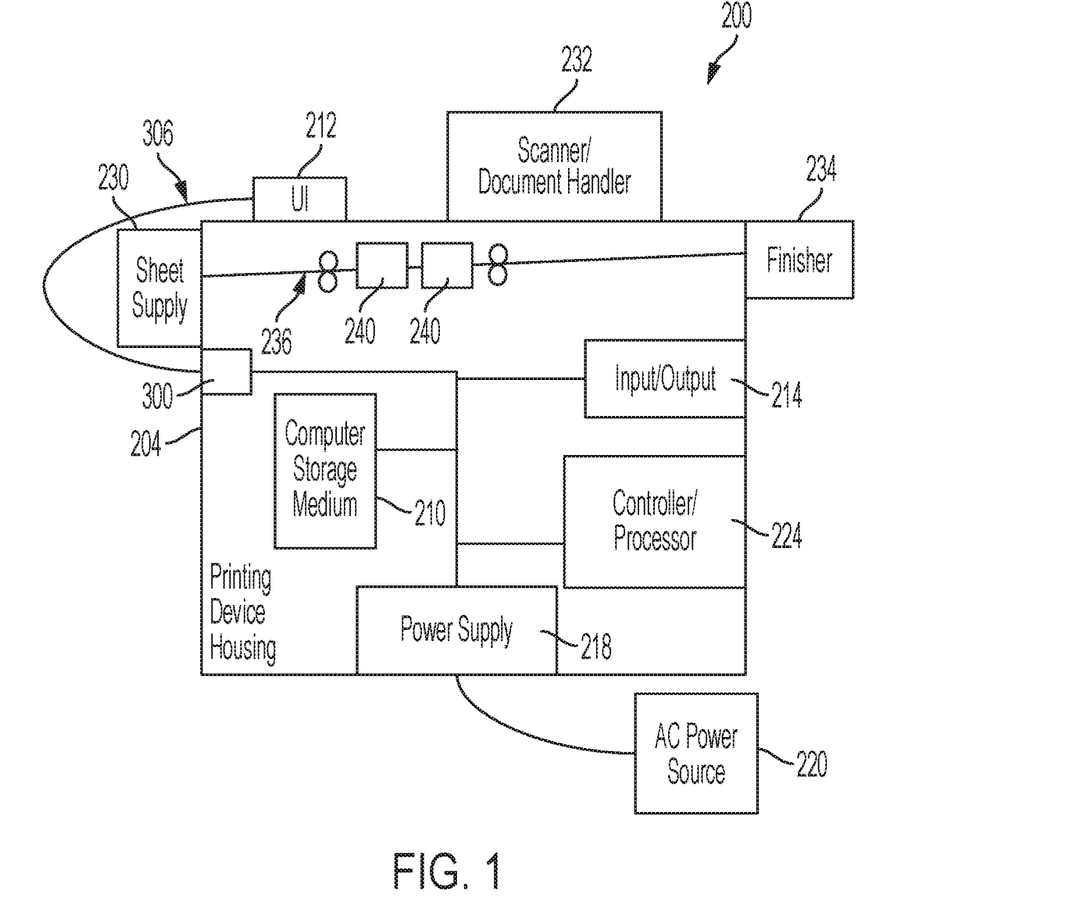
FIG. 1 is a conceptual schematic diagram illustrating printing devices herein.

FIG. 1 illustrates many components of printer structures 200 herein that can comprise, for example, a printer, copier, multi-function machine, multi-function device (MFD), kiosk, portable printer, etc. The printing device 200 includes a controller/tangible processor 224 within an enclosed body 204. A communications port (input/output) 214 is operatively connected to the tangible processor 224 and to a computerized network external to the printing device 200. Also, the printing device 200 can include at least one accessory functional component, such as a user interface (UI) assembly 212. The user may receive messages, instructions, and menu options from, and enter instructions through, the user interface or control panel 212.

The input/output device 214 is used for communications to and from the printing device 200 and comprises a wired device or wireless device (of any form, whether currently known or developed in the future). The tangible processor 224 controls the various actions of the printing device 200. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device 200 to perform its various functions, such as those described herein. Thus, as shown in FIG. 1, a body housing 204 contains one or more functional components that operate on power supplied from an alternating current (AC) source 220 converted by the power supply 218 to the appropriate voltage, current, amperage, etc. The power supply 218 can comprise a common power conversion unit (inverter, converter, etc.), power storage element (e.g., a battery, etc.), etc.

The printing device 200 includes at least one marking device (printing engine(s)) 240 that use marking material and are operatively connected to the processor 224. A media path 236 is positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 200 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 240 can include, for example, devices that use electrostatic toner printers, inkjet printheads, contact printheads, three-dimensional printers, etc. The one or more printing engines 240 can include, for example, devices that use a photoreceptor belt or an intermediate transfer belt or devices that print directly to print media (e.g., inkjet printers, ribbon-based contact printers, etc.).

Thus, as shown, the processor 224 is located within the body 204 and is connected to the internal power supply 218. Further, printing components 240 are within the body 204 and are connected to the internal power supply 218 and the processor 224. The user interface 212 can be, for example, a (potentially removable) tablet interface device (e.g., touchscreen, etc.) and is shown in FIG. 1 to be positioned external to the body 204 but connected to the processor 224 and the internal power supply 218 through a single universal serial bus (USB) connection 306. The USB hub structure 300 is also within the body 204 and is integral to the printing device 200 and is connected to the processor 224, the internal power supply 218, the user interface 212, etc.

Figure 2A:
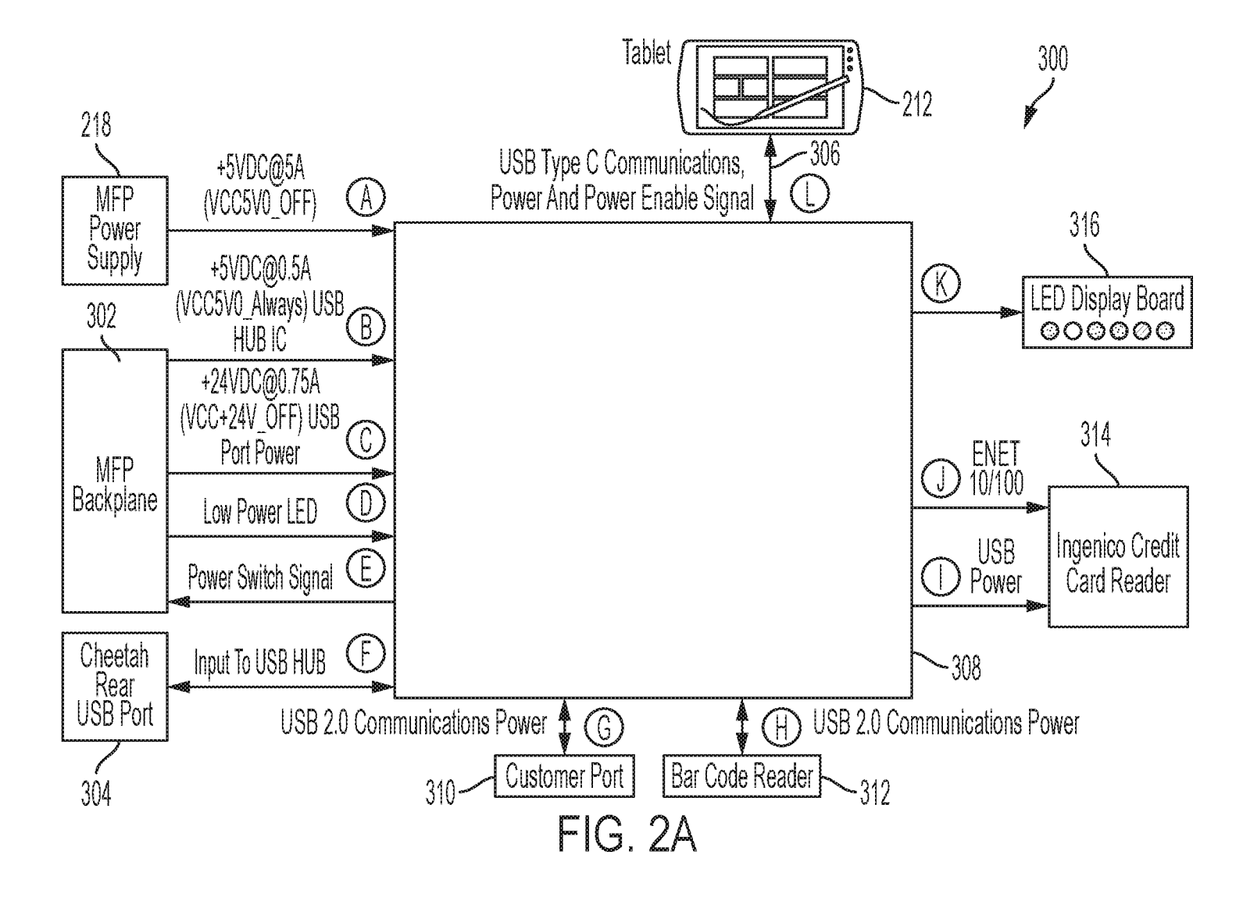
FIGS. 2A-2B are conceptual schematics diagram illustrating USB devices herein.
Figure 2B:
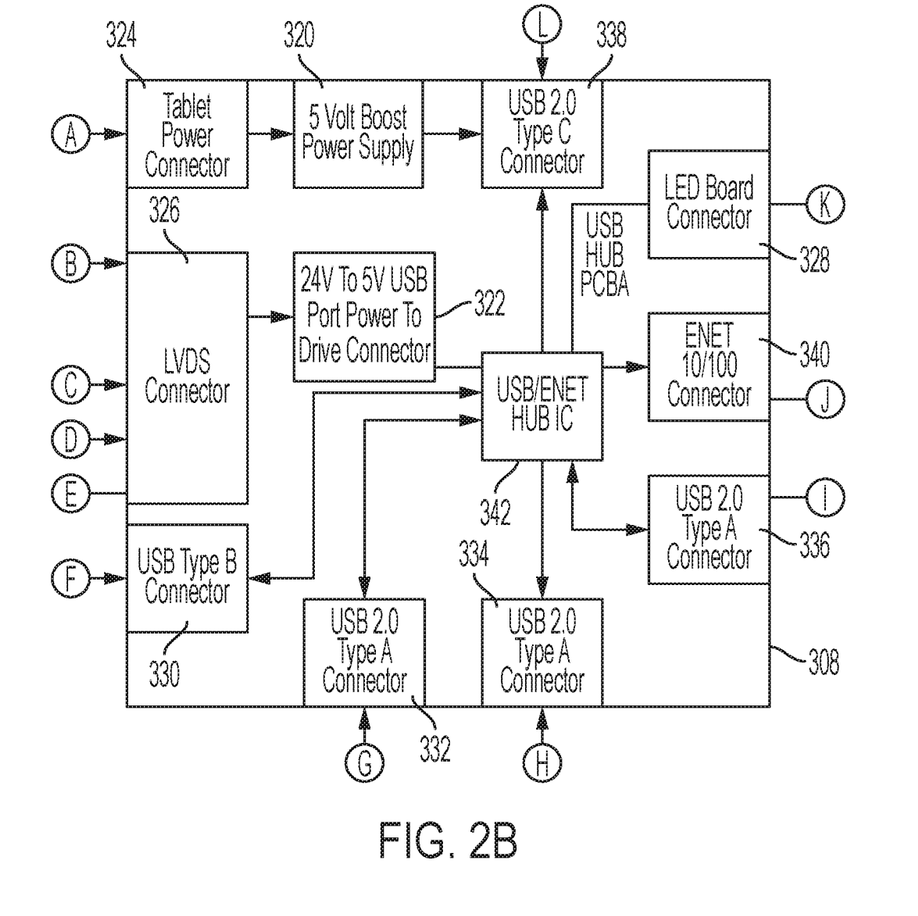

FIGS. 2A-2B show the user interface 212 and some elements of the universal serial bus (USB) hub structure 300 in greater detail. Specifically, FIGS. 2A-2B illustrate a single device with the same circuit board 308 being shown generally in FIG. 2A and in greater detail in FIG. 2B. The wiring connections to and from the circuit board 308 are shown in both FIGS. 2A and 2B using letters A-L, and such are intended to show the same unbroken, direct electrical connections.

Thus, in some examples herein, the USB hub structure 300 can include the circuit board 308 (e.g., printed circuit board 308 assembly (PCBA)) positioned within the body 204 of the printing device 200. Such a circuit board 308 includes components such as an integrated circuit chip (IC 342) mounted on the circuit board 308 within the body 204. As is understood, wiring from the circuit board 308 (not shown to avoid clutter) within (and potentially through) the body 204 can accommodate for any physical spaces that may exist between the circuit board 308 and the body 204 within the interior of the printing device 200.

At least one ethernet connector 340 (e.g., 10/100) can be mounted on the circuit board 308 and be connected to the IC 342, etc. Also, a plurality of USB connectors 330-338 can be mounted on the circuit board 308 and connected to the IC 342, etc. The USB connectors 330-338 can include many different types of USB connectors including 2.0 Type A 332, 334, 336; Type B 330; 2.0 Type C 338; etc. Also, for example, the host USB port 304 can connect to USB connector 330 and USB connector 332 can be provided as one or more customer ports 310 for customer items to be connected. As show in FIGS. 3 and 4, that are discussed in greater detail below, these connectors may extend through the body 204 to allow easy connection from outside the printing device 200. Most other USB connections herein are completely internal to enhance security and decrease external clutter.

The IC 342 allows direct communication between these various connectors, allowing one device plugged into one connector to communicate directly with another device plugged into a different connector, without having to go through the processor 224 of the printing device 200. Thus, the USB hub 300 allows peripheral devices to directly connect to other peripherals, including bar code readers 312, card readers 314, customer devices 310, the user interface 212, etc., thereby bypassing the processor 224 of the printing device 200 and avoiding the associated processing delay and unnecessary consumption of the computing resources of the processor 224.

Any form of peripheral device can be connected to the connectors 300-338, 340. For example, the bar code reader 312 and/or credit card reader 314 that form part of the external body 204 can be connected internally to at least one of the USB connectors (e.g., USB connectors 334 and 336, and possibly the ethernet connector 340). In additional examples, a light emitting diode (LED) connector 328 can be mounted on the circuit board 308 and connected to the IC 342, and the LED connector 328 can also connect to an LED board 316 that has LED lights that are visible from locations external to the body 204.

Also, power connectors/converters 320, 324 (e.g., 5V boost) are mounted on the circuit board 308 within the body 204 and such items are connected to the internal power supply 218. As shown in FIGS. 2A-2B, a backplane connector 326 (e.g., low-voltage differential signaling (LVDS) connector) and backplane converter 322 (e.g., 24V to 5V) are mounted on the circuit board 308 within the body 204 and are connected to the IC 342 and the processor 224 through an MFP backplane 302. The MFP backplane 302 is separate from the USB hub 300 and comprises wiring, busses, etc., that interconnect various internal components, such as the ones shown in FIG. 1 that are discussed above. In some examples, the backplane converter/connector 322, 326 can accommodate power, LED controls, power switch controls, etc.

In some embodiments, the internal power supply 218 is an AC/DC converter and the USB hub structure 300 is physically separated from the internal power supply 218 by a sufficient distance to thermally isolate the heat generated by the AC/DC converter 218 from reaching the circuit board 308, which improves reliability of the circuit board 308. Further, the internal power supply 218 has components sized to produce voltage/amperage output that is matched to the input requirements of various connected device, such as the user interface 212, which eliminates the circuit board 308 from performing significant voltage/amperage step-up or step-down, which further reduces the heat generated at or near the circuit board 308.

Thus, while the various power connectors/converters 320-324 shown in FIGS. 2A-2B can filter, adjust, and convert power output for different devices, because all or the majority of the power conversion (e.g., more than 85%, 90%, or 95%, etc.) is performed by the internal power supply 218 of the printing device 200, power loss and heat generation are minimized. For example, AC/DC power conversion can produce more heat relative to DC/DC conversion, and the USB hub structure 300 may only perform DC/DC conversion, leaving all AC/DC conversion to the internal power supply 218 in order to reduce heat generation at the USB hub structure 300.

Therefore, the various power connectors/converters 320-324 mostly act as pass-through devices that merely forward or slightly adjust the voltage/amperage power supplied by the internal power supply 218 to the external USB connectors. The various power connectors/converters 320-324 can verify, filter, and slightly adjust the voltage/amperage power received from the internal power supply 218; however, power conversion itself is not the primary function of such power connectors/converters 320-324, allowing the power connectors/converters 320-324 to be made smaller, lighter, and less expensively.

Specifically, the internal power supply 218 is a larger, higher performance component, as are any of the high efficiency power converters on the USB hub structure 300 relative to the stand-alone "brick" AC/DC converters normally accompanying peripherals that are cost-driven to be as inexpensive as possible. This allows the internal power supply 218 to be more reliable and to convert power more efficiently with a lower power loss and less heat generation. Further, the internal power supply 218 can include dedicated cooling mechanisms (fans, heat sinks, liquid cooling, etc.) allowing heat that the internal power supply 218 generates to be easily and efficiently accommodated. Therefore, the USB hub structure 300 herein does not suffer heat related performance and reliability problems because of the use of the internal power supply 218 to perform a large portion of the power conversion. Again, the power converters of off-the-shelf devices are commonly within enclosures, which trap the heat and allow heat to build up inside printing devices.

In some non-limiting examples, the internal power supply 218 may have controllable outputs that can output specific voltages (e.g., 1V, 5V, 10V, 15V, 25V, etc.) and amperages (1 A, 2 A, 5 A, 10 A, 20 A, etc.) of DC current. The voltages/amperages output by the internal power supply 218 can be previously established based on what designers expect to likely be connected to the USB hub 300 or the IC 342 can dynamically control the internal power supply 218 to dynamically adjust variable components of the internal power supply 218 to produce a needed voltage/amperage of a specific peripheral. The data communication between peripherals and the IC 342 potentially allows the IC 342 to interrogate a connected peripheral to determine a specific voltage/amperage needed by that connected peripheral. Again, this allows the power connectors/converters 320-324 to perform mostly pass-through operations and not power conversions because the internal power supply 218 performs the majority of the heat generating power conversion.

Further, with the USB hub 300, all connections to peripheral devices are dramatically simplified because the USB connectors 330-338 can supply power while providing communications. Specifically, the USB connection 306 of the user interface 212 to one of the USB connectors 338 supplies both data and power to the user interface 212. Therefore, the USB connectors 330-338 are the only electrical and communication connection between the peripherals and the printing device 200. This eliminates multiple connections to the peripherals and simplifies connecting the peripherals to the printing device 200.

Figure 3:
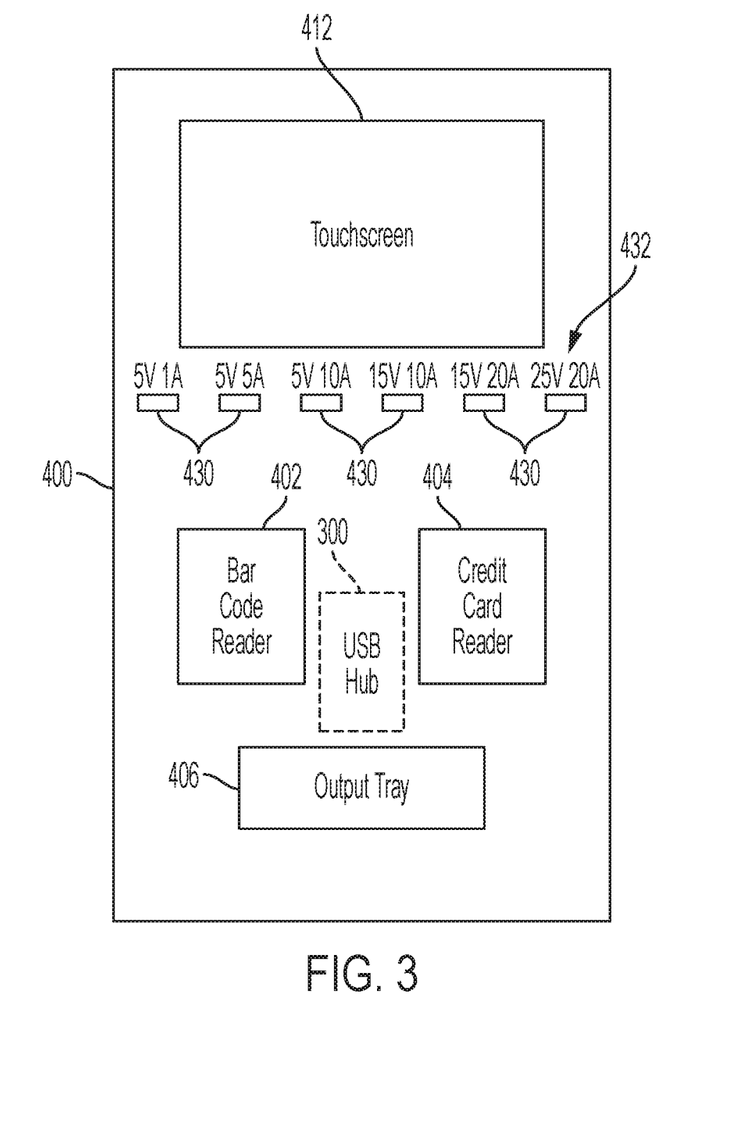
FIG. 3 is a conceptual schematic diagram illustrating kiosk-type printing devices herein.

FIG. 3 shows a printing and document/image processing kiosk 400 designed for use in public spaces. Such a device can include the components shown in FIG. 1 discussed above. The kiosk 400 can also include, among other components, various USB connectors 430 for user access that can be identified on the exterior of the body 204 with different voltages/amperages on labels 432. Again, the exterior of the body 204 would also allow access to useraccessible portions of a bar code reader 402, a credit card reader 404, and a touchscreen user interface 412; all of which are connected internally to the internal USB hub 300 that is shown using dashed lines in FIG. 3 to indicate its internal location. An output tray 406 provides any printed output to the user of the kiosk 400.

The USB hub 300 within the kiosk 400 allows all peripheral devices 402, 404, 412, 430 to be easily and efficiently interconnected to each other and to the processing components of the kiosk 400. Therefore, if cost efficient, each of such devices 402, 404, 412, 430, etc., could be off-the-shelf or specially designed devices that are simply integrated together using the internal USB hub 300. As an extra feature, the externally supplied USB connectors 430 allow one or more users to transfer data to and from the kiosk 400 and to simultaneously charge their individual smart devices using the voltage and amperage preferred by the user.

The IC 342 of the USB hub 300 has components and software elements that automatically recognize and match the communication protocols and needs of the diverse devices that are connected to the USB hub 300, allowing just the physical connection of the devices to the USB connections 330-338, 430 alone to be the only action needed to be taken in order to automatically establish proper data communication between such diverse devices. In some situations, and for some specific devices, minor programming and/or modification of the IC 342 may be useful to allow full and proper communications between the different devices that are connected to and through the USB hub 300.

With this, for example, the touchscreen 412 can emulate an extension of a user's smart device that is connected to one of the USB connectors 430. Similarly, the various readers 402, 404 do not need to be specifically designed for the kiosk, but instead can be powered by and controlled directly through the USB hub 300. Further, the readers 402, 404 can be controlled directly by the user's connected smart device or by a processor within the kiosk 400. Therefore, the internal USB hub 300 permits such kiosk devices 400 to be easily and efficiently designed, assembled, and powered from individual unrelated components without requiring significant interconnections between such diverse elements.

Figure 4:
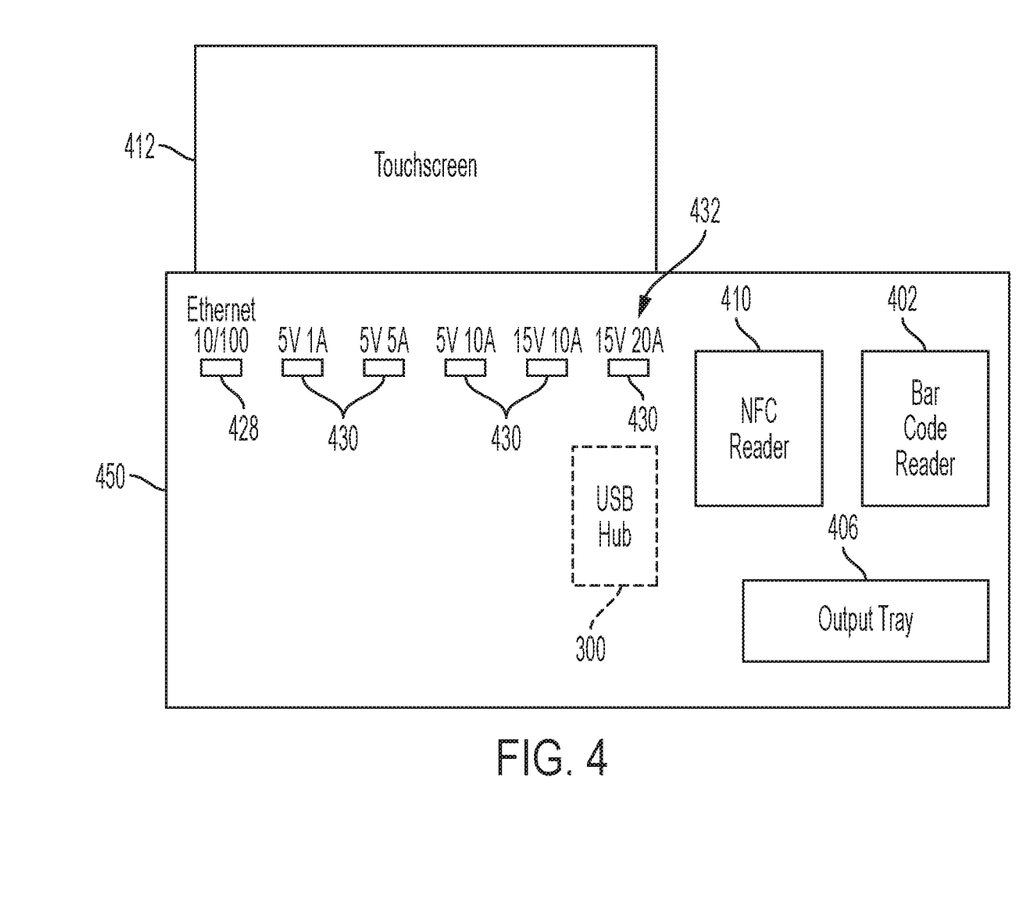
FIG. 4 is a conceptual schematic diagram illustrating printing devices herein.

FIG. 4 shows another example of a commercial multi-function device (MFD) 450 that similarly can include the components shown in FIGS. 1 and 3, discussed above. Alternatively (or in addition) the MFD 450 can include a near field communication (NFC) reader device 410 and an ethernet connector 428. Similar to that discussed above, the NFC reader 410 can simply be added to the MFD 450 through physical placement and physical USB connection to the USB hub 300, without substantial design of power and communication requirements.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, the Applicant does not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing device comprising:
a body;
an internal power supply within the body;
a processor within the body and connected to the internal power supply;
printing components within the body and connected to the internal power supply and the processor;

a user interface external to the body and connected to the processor and the internal power supply, wherein the user interface has a universal serial bus (USB) connection; and a USB hub structure within the body and connected to the processor, the internal power supply, and the user interface, wherein the USB hub structure comprises:
an integrated circuit (IC);
a power connector connected to the internal power supply; and
a plurality of USB connectors connected to the IC, wherein one of the USB connectors connects the USB connection of the user interface to the processor and the internal power supply, and wherein the USB connection of the user interface to one of the USB connectors supplies data and power to the user interface.

2. The printing device according to claim 1, wherein the internal power supply is separate from the USB hub structure and comprises a converter outputting direct current (DC) to the power connector.

3. The printing device according to claim 1, wherein the internal power supply has output matched to input requirements of the user interface.

4. The printing device according to claim 1, further comprising:
a light emitting diode (LED) connector mounted on the USB hub structure and connected to the IC, wherein the LED connector extends through the body; and
an LED board comprising LED lights external to the body and connected to the LED connector.

5. The printing device according to claim 1, wherein the USB connection of the user interface to one of the USB connectors is the only electrical and communication connection between the user interface and the printing device.

6. The printing device according to claim 1, further comprising at least one of a bar code reader and a credit card reader connected to the USB connectors.

7. A printing device comprising:
a body;
an internal power supply within the body;
a processor within the body and connected to the internal power supply;
printing components within the body and connected to the internal power supply and the processor;
a tablet device external to the body and connected to the processor and the internal power supply, wherein the tablet device has a universal serial bus (USB) connection; and
a USB hub structure within the body and connected to the processor, the internal power supply, and the tablet device, wherein the USB hub structure comprises:
a board within the body having an integrated circuit (IC);
a power connector mounted on the board within the body and connected to the internal power supply;
an ethernet connector mounted on the board and connected to the IC, wherein the ethernet connector extends through the body; and
a plurality of USB connectors mounted on the board and connected to the IC, wherein one of the USB connectors connects the USB connection of the tablet device to the processor and the internal power supply through the board, and wherein the USB connection of the tablet device to one of the USB connectors supplies data and power to the tablet device.

8. The printing device according to claim 7, wherein the internal power supply is separate from the board comprises a converter outputting direct current (DC) to the power connector.

9. The printing device according to claim 7, wherein the internal power supply has output matched to input requirements of the tablet device.

10. The printing device according to claim 7, further comprising:
a light emitting diode (LED) connector mounted on the board and connected to the IC, wherein the LED connector extends through the body; and
an LED board comprising LED lights external to the body and connected to the LED connector.

11. The printing device according to claim 7, wherein the USB connection of the tablet device to one of the USB connectors is the only electrical and communication connection between the tablet device and the printing device.

12. The printing device according to claim 7, further comprising at least one of a bar code reader and a credit card reader connected to at least one of the USB connectors and the ethernet connector.

13. A printing device comprising:
a body;
an internal power supply within the body, wherein the internal power supply comprises an AC/DC converter;
a processor within the body and connected to the internal power supply;
printing components within the body and connected to the internal power supply and the processor;
a tablet interface device external to the body and connected to the processor and the internal power supply, wherein the tablet interface device has a universal serial bus (USB) connection; and
a USB hub structure within the body and connected to the processor, the internal power supply, and the tablet interface device, wherein the USB hub structure is separate from the internal power supply, wherein the USB hub structure comprises:
a printed circuit board assembly (PCBA) within the body having an integrated circuit (IC);
a power connector mounted on the PCBA within the body and connected to the internal power supply;
a backplane connector mounted on the PCBA within the body and connected to the IC and the processor;
an ethernet connector mounted on the PCBA and connected to the IC, wherein the ethernet connector extends through the body; and
a plurality of USB connectors mounted on the PCBA and connected to the IC, wherein ones of the USB connectors extend through the body, and wherein one of the USB connectors connects the USB connection of the tablet interface device to the processor and the internal power supply through the PCBA, and wherein the USB connection of the tablet interface device to one of the USB connectors supplies data and power to the tablet interface device.

14. The printing device according to claim 13, wherein the internal power supply has output matched to input requirements of the tablet interface device.

15. The printing device according to claim 13, further comprising:
- a light emitting diode (LED) connector mounted on the PCBA and connected to the IC, wherein the LED connector extends through the body; and
- an LED board comprising LED lights external to the body and connected to the LED connector.

16. The printing device according to claim 13, wherein the USB connection of the tablet interface device to one of the USB connectors is the only electrical and communication connection between the tablet interface device and the printing device.

17. The printing device according to claim 13, further comprising at least one of a bar code reader and a credit card reader connected to at least one of the USB connectors and the ethernet connector.

* * * * *